United States Patent [19]

Dellecker

[11] 3,889,068

[45] June 10, 1975

[54] CAMP-ON CIRCUITRY

[75] Inventor: Raymond Whyte Dellecker, Denver, Colo.

[73] Assignee: Bell Telephone Laboratories, Incorporated, Murray Hill, N.J.

[22] Filed: June 27, 1974

[21] Appl. No.: 483,898

[52] U.S. Cl. .............................................. 179/18 BG
[51] Int. Cl. .............................................. H04m 3/42
[58] Field of Search .................................. 179/18 BG

[56] References Cited

UNITED STATES PATENTS 3,676,606 7/1972 Gueldenpfennig ............ 179/18 BG

*Primary Examiner*—William C. Cooper
*Attorney, Agent, or Firm*—F. W. Padden

[57] ABSTRACT

This specification discloses electronic camp-on control circuitry for use in a common control switching system serving as a private branch exchange. The system utilizes a crossbar switch network for completing local intercom calls within the exchange as well as incoming calls from a central office. A plurality of link circuits and logic circuits including a link scanner are provided in the camp-on circuitry for determining the camp-on busy-idle status of telephone stations via links through the crossbar network and associated line circuits. The camp-on circuitry generates a command for applying busy tone to calling party on all local intercom calls and on incoming central office calls when a called station is camp-on connected to another call. A network command is also generated by the camp-on circuitry to complete a camp-on connection for an incoming call when connections to a busy called station are not already camped-on.

19 Claims, 7 Drawing Figures

CAMP-ON CIRCUITRY

BACKGROUND OF THE INVENTION

This invention relates to communication systems and particularly to circuitry for controlling the camp-on connection of calls to busy telephone stations.

Camp-on service is one of the many sophisticated services utilized in telephone switching systems. It serves to couple an incoming call onto connections extending to a busy called telephone station while at the same time isolating that call speechwise from the called station until it becomes idle. When the latter occurs, the called station is immediately rung for the camping-on call and conversation on the incoming call can commence after the called party answers. This service obviously speeds call processing and aids in serving calls in their approximate order of arrival.

A trend in the development of small telephone switching systems, such as PBXs (Private Branch Exchanges), has been to design equipment which excludes sophisticated service features including camp-on and provides only basic automatic telephone switching of local intercom and incoming-outgoing calls via a central office. While such systems have widespread utility and have proven to be economically attractive for a substantial segment of the PBX market, their versatility for later fulfilling expanded customer demands for sophisticated features beyond the basic service package is sometimes limited. Illustratively, it occasionally is burdensome or economically impractical to integrate or retrofit camp-on service into a basic service PBX operating on customer premises and importantly, with minimal service disruption and cost to the customer.

As a result, a proven need has existed in the art for improved camp-on facilities and particularly for camp-on equipment which is capable of being retrofitted into unequipped systems are minimal service outage and reasonable prices to customers.

SUMMARY OF THE INVENTION

In accordance with principles of my invention, the foregoing needs and others are fulfilled by providing exemplary camp-on equipment which comprises reasonably simple and economical circuitry that is integratable into a communication system, such as a PBX, as original equipment or on a retrofit basis with reduced service outage and reasonable costs. The circuitry functions illustratively to allow only one incoming call from a central office to be camp-on connected to connections extending to a busy called customer station. My illustrative circuitry is equipped to deny camp-on service on intercom calls between customers served within the PBX.

My exemplary camp-on control circuitry is suitable for use in a switching system having a plurality of station line circuits and a common control circuit including means for selectively applying an enabling signal to the line circuits during an addressing of the line circuits to determine an initial busy-idle call status of the associated stations. Specifically, the camp-on control circuitry includes means responsive to a busy call status signal from a called one of the line circuits on an intercom call for controlling an immediate return of called party busy signal to the calling station. For an inward call from the central office, my camp-on circuit further includes means responsive to a busy call status signal from the called line circuit for withdrawing the enabling signal from the line circuits to ascertain the camp-on busy-idle status of the called one of the line circuits. Such a line circuit is camp-on busy when an incoming call is bridged onto connections extending to the associated called station. It is camp-on idle when no such bridge connections are established to the called station. Advantageously, my camp-on circuitry includes a busy control means which is activated following a receipt of a camp-on busy signal from the called one of the line circuits for immediately controlling a return of a supervisory busy signal to the calling station.

The camp-on control circuitry advantageously comprises means including a plurality of link circuits and a link scanner which are responsive to a receipt of a camp-on idle status signal for both examining each of the line circuits to identify a called one of the line circuits while it is concurrently addressed by the common control circuits and thereafter controlling a completion of camp-on connections to the identified called one of the line circuits.

It is a feature of my invention that each of the link circuits is operatively connected to an individual one of the link paths extending through the system switching network and that the link scanner is activated upon a receipt of a camp-on idle status signal on an inward terminating call from the central office and for the purpose of sequentially addressing each of the link circuits individually to operate the called one of the line circuits via the associated link path through the switching network. The link scanner is deactivated in response to a link circuit operation of the called one of the line circuits for stopping scanner addressing and thereby to identify the link connections through the systems switching networks which are then serving the called one of the line circuits. Thereafter, the camp-on control circuitry cooperates with the common control facilities to control a completion of camp-on connections to the identified link connections.

It is another feature of my invention that the link circuits and link scanner are designed illustratively for use in a common control switching system having a coordinate switch network in which functional circuits, such as telephone line and trunk circuits are, by way of example, connected to switch vertical terminations and in which the switch horizontal terminations provide links between and among the functional circuits. In such a system, call connections between functional circuits are effected by switch crosspoint closures at coordinate vertical and horizontal intersections.

According to my invention, each of the link circuits is permanently wired to an individual coordinate switch horizontal link for operative connection to any one of the line circuits when it is busy on a call. An advantage of this link circuit arrangement is that the wiring connections may be quickly made on a retrofit basis without a need for any service interruption. Accordingly, when a link circuit is addressed by the link scanner, a signal is supplied by that link circuit through the switch horizontal link and the switch vertical for operating the called line circuit which, in turn, returns a camp-on control signal through the coordinate switch network. The latter signal activates my camp-on control circuitry to stop scanner addressing at the operated called line circuit and concurrently to generate a network command for controlling a completion of a camp-on connection via the switch horizontal link to the called line circuit.

The illustrative embodiment is arranged to complete camp-on connections for a central office trunk circuit serving a terminating call inward to a PBX customer station. The trunk circuit is conventionally equipped to supply a special camp-on supervisory signal to the coordinate switch horizontal to which it is camp-on connected. This signal indicates a camp-on busy condition and is extended to the associated busy called line circuit for precluding more than one camp-on connection of a trunk circuit at a time. In accordance with my invention, the camp-on busy signal to effective to continue a busy signaling operation of the called line circuit after, as previously explained, the line circuit enabling signal is withdrawn to ascertain the camp-on busy-idle status of the called line circuit. The continued operation of the line circuit enables my illustrative camp-on control circuitry speedily to recognize a camp-on busy condition without a necessity for link scanner and link circuit operations.

To do so, my camp-on control circuitry includes a logic gate which is activated in response to a coincidence of an inward terminating call signal and an initial line busy signal for operating a first bistable switching device to cause the line circuit enabling signal to be withdrawn. My invention further monitors the initial line busy signal with a delay device to determine whether that signal persists in response to a camping-on trunk circuit operation of the line circuit under control of the special camp-on supervisory signal. If the busy signal persists beyond a delay interval, the delay device activates other gating arrangements of my exemplary embodiment for generating a command instruction that causes a busy tone to be returned to the calling party.

It is another feature of my invention that the link scanner is activated for sequentially address scanning the link circuits only when the initial line busy signal does not persist following the aforementioned withdrawal of the line circuit enabling signal. The link scanner activation is needed at that point to identify the coordinate switch horizontal link to which the called line circuit is connected. Advantageously, I provide another logic gate which monitors and detects, under control of the first bistable device, a removal of the initial line busy signal. The gate then operates a second bistable switching device for starting the link scanner sequentially to address each of the link circuits until the link circuit associated with the called line circuit is addressed. When that occurs, the latter link circuit changes the voltage on a supervisory lead of the coordinate switch horizontal link path to the called line circuit for activating it to extend a camp-on control signal back through the switch network to the common control circuit. The camp-on control signal then activates a gate device in my camp-on control circuitry for stopping further link scanner addressing and concurrently generating a network command to cause a camp-on connection to be established in a known manner between the calling central office trunk circuit and the horizontal link then associated with the called line circuit. During the camp-on, the call on the latter trunk circuit is isolated speechwise from the called station until it becomes idle. When the latter occurs, the called station is rung for the camping-on call and conversation can commence when the called station answers.

The illustrative camp-on circuitry is advantageously useful in a PBX essentially of a design disclosed in W. W. Greason - D. W. Weiner U.S. Pat. Nos. 3,697,701 and 3,697,700, of Oct. 10, 1972, as well as R. W. Dellecker, et al, U.S. Pat. No. 3,723,661 of Mar. 27, 1973. In accordance with my exemplary embodiment, the crossbar switching network disclosed in these patents is modified to terminate functional switching circuits, such as lines and trunks, on the switch verticals instead of the switch horizontals as disclosed in the patents and to utilize the horizontals as links between the verticals. It is an advantage that my camp-on circuitry is simply retrofitted into the modified patent arrangements by simply connecting each of the link circuits to a sleeve termination of the crossbar switch horizontal and connecting six available control signals from strategic points in the common control circuit, CC of the patents, to inputs of my camp-on control circuitry. Three output leads from my control circuitry are concurrently connectable to the common control circuit for generating an APPLY BUSY TONE COMMAND and a NETWORK COMMAND as well as for controlling a withdrawal of the line circuit enable signal. Accordingly, it is apparent that my illustrative camp-on circuitry can be readily integrated on a retrofit basis with minimal service disruption and at reasonably low cost to both the customer and telephone company.

DESCRIPTION OF THE DRAWING

The foregoing and other features of my invention will become apparent from a reading of the following description of an illustrative embodiment of the invention taken in conjunction with the drawing in which.

Figure 4:
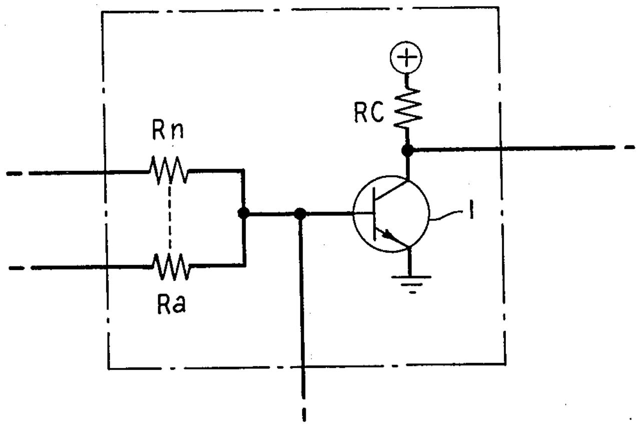
FIG. 4 illustrates a basic transistor-resistor logic circuit that is utilized in the circuits of FIGS. 2 and 3 as a gate.
Figure 5:
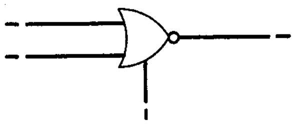
FIG. 5 depicts the symbolization used for the circuit in FIG. 4.
Figure 6:
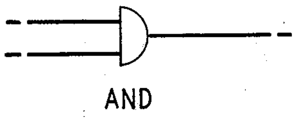
FIG. 6 depicts the symbol used for an AND gate circuit of FIG. 3.
Figure 7:
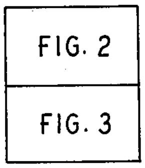
FIG. 7 shows an alignment of FIGS. 2 and 3 for functional interconnections.

The transistor-resistor logic circuit depicted in FIG. 4 comprises a single NPN transistor 1, a collector resistor RC and a plurality of input transistors *Ra–Rn* of which there is one for each input to the stage. The circuit of FIG. 4 is basically a single stage inverter since a positive signal hereinafter referred to as a HIGH (approximately +24 volts) applied to the base appears as a negative signal hereinafter referred to as a LOW (approximately ground potential) at the collector and vice versa.

The stage may be used as an inverting OR gate by leaving the circuit normally OFF; that is, with all inputs LOW. In this case a HIGH signal applied to one or more of the input leads will turn the transistor ON and provide a LOW signal on the collector. The stage may also be used as an inverting AND gate in which case the transistor is normally held ON by a HIGH signal applied to one or more of its input leads. The AND condition of the circuit is achieved by a LOW potential on all input leads at which time the transistor turns OFF and produces a HIGH signal at its output.

Figure 1:
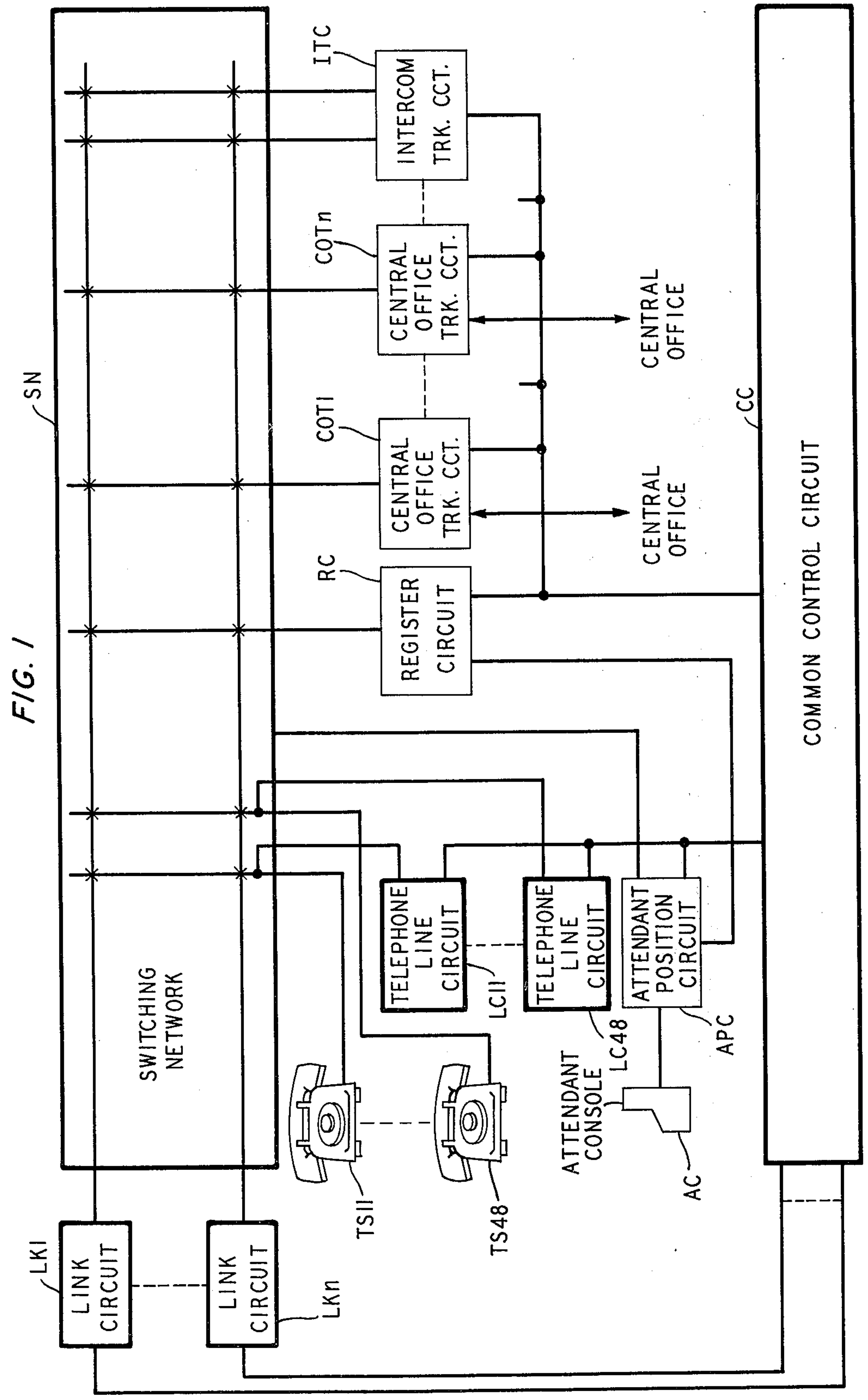
FIG. 1 comprises a block diagram of a telephone switching system utilizing my invention.

It is noted that the invention is particularly concerned with structural details of the link, line and common control circuits as well as the switching network shown in heavy lined blocks of FIG. 1. The detailed design of the other circuit units form no part of the present invention and are therefore neither shown nor described in detail herein except where necessary for a complete understanding of my invention. For example, the switching network may illustratively be a conventional crossbar switch network with all of the functional switching circuits such as registers, trunks and line circuits terminated on the switch verticals and with the switch horizontals providing links between or among the functional circuits. My illustrative embodiment advantageously utilizes such a network arrangement for camp-on testing and control by the common control circuits via an individual link circuit connected to the conventional sleeve lead of each crossbar switch horizontal and through an associated line circuit.

GENERAL DESCRIPTION

The telephone system as disclosed in FIG. 1 is particularly suitable for use as a small private branch exchange which includes a plurality of telephone stations TS11–TS48, each of which is connected to a correspondingly numbered one of the line circuits LC11–LC48 via a switching network SN. Each of the line circuits is additionally connected to a common control circuit CC. Network SN provides switch links for call connections and also terminates a number of trunk circuits such as central office trunk circuits COT-1–COT*n*, intercom trunk circuit ITC, register RC, and an attendant position circuit APC to an attendant console AC. The common control circuit CC regulates and coordinates the operation of every circuit in the system during the serving of calls and accordingly it is connected to the line circuits, switching network, register, and the various trunk circuits.

The present invention is particularly concerned with the camp-on circuit structure and operations involving the line circuits LC11–LC48, network SN and the control circuit CC as related to calls terminating at one of the stations TS11–TS48. The remainder of the circuit operations are not needed for a complete understanding of my invention and therefore are not described in detail. A terminating call received, for example, in trunk circuit COT1 from a central office results in the operation of the common control CC whereby the address of the called station such as station TS11 is stored in control circuit CC. The latter circuit then enables all line circuits, but addresses only the called one of them to ascertain whether it is initially busy or idle. When the called station is idle, the associated line circuit when addressed sends an idle status signal to the common control via network SN.

If the called station is busy, the associated line circuit cooperates with network SN to inform the common control CC of the busy status and to initiate a camp-on test sequence. This test sequence determines whether the connections through network SN for a currently existing call to station TS11 may be camped-on by the incoming call extended to trunk circuit COT1 from the central office or whether those connections are already camped-on by another call. If the test reveals that station TS11 is not camped-on and therefore camp-on idle, control circuit CC sequentially address scans the link circuits LK1–LK*n* to locate the horizontal link of the crossbar switch associated with line circuit LC11. The location is made by the scanned link circuit marking the sleeve lead of the associated horizontal link for, in turn, activating line circuit LC11 for supplying a camp-on idle signal to control circuit CC via network SN. Circuit CC then operates network SN to camp-on connect trunk circuit COT1 to the identified link. Trunk circuit COT1 thereafter supplies a special supervisory signal to the sleeve lead of the switch link for indicating a camp-on busy condition on the identified link. In the camped-on state, trunk circuit COT1 is isolated speechwise from the camped-on link connections. It is only cut-through for call conversation after the prior call is terminated.

On the other hand, when a camp-on test sequence is initiated by the control circuit CC and the crossbar link to the called station is already camped-on, the special supervisory signal supplied over the sleeve lead by the camping-on trunk circuit activates the line circuit LC11 for supplying a camp-on busy condition to the control circuit CC via network SN during the camp-on test sequence. Upon detecting the camp-on busy, the common control CC causes a busy tone to be returned via the calling trunk circuit to the central office in a known manner.

DETAILED DESCRIPTION

Figure 2:
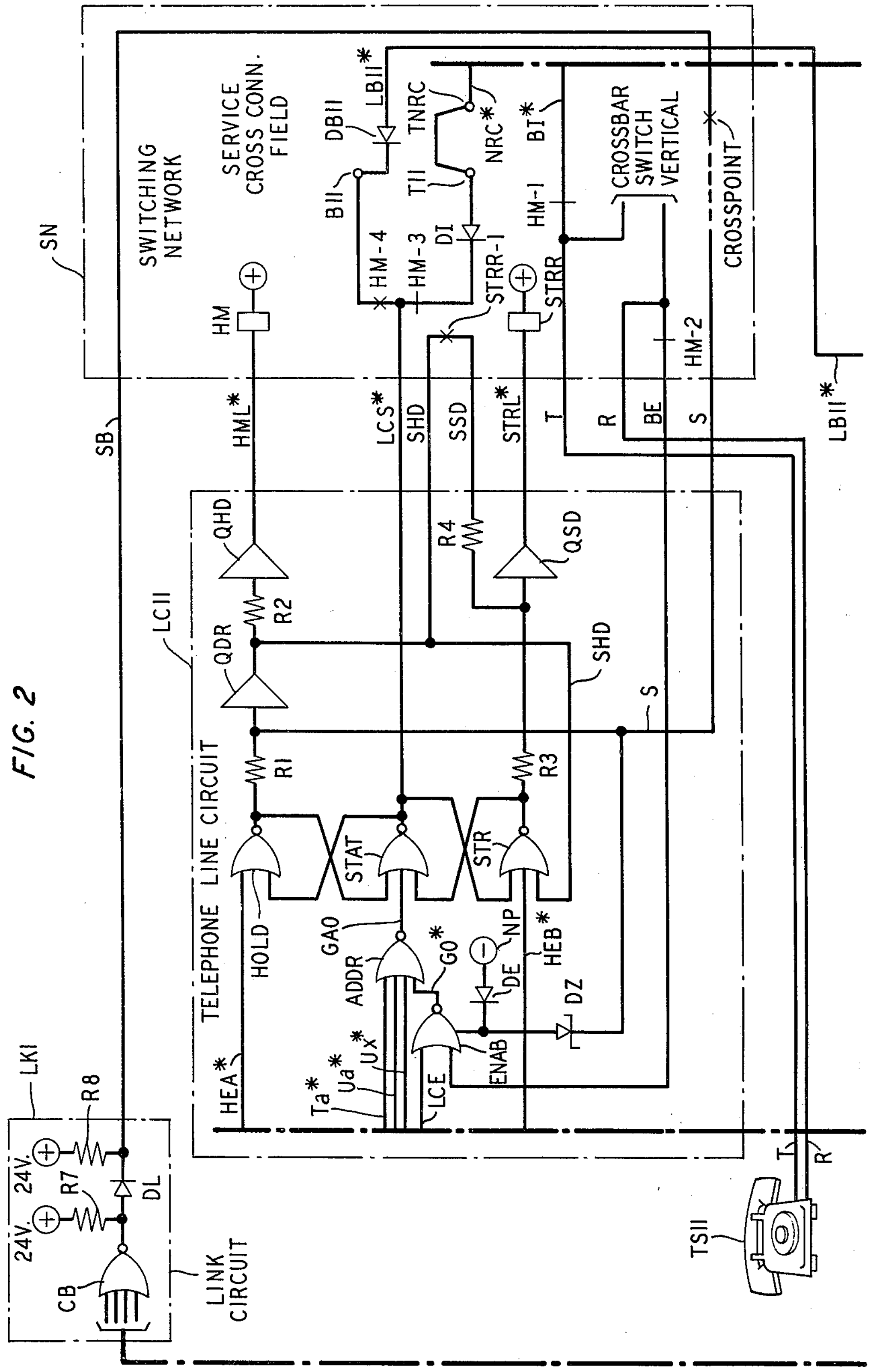
FIG. 2 is a schematic drawing of a basic link circuit, a telephone line circuit, and portions of a switching network utilized for camp-on call switching.
Figure 3:
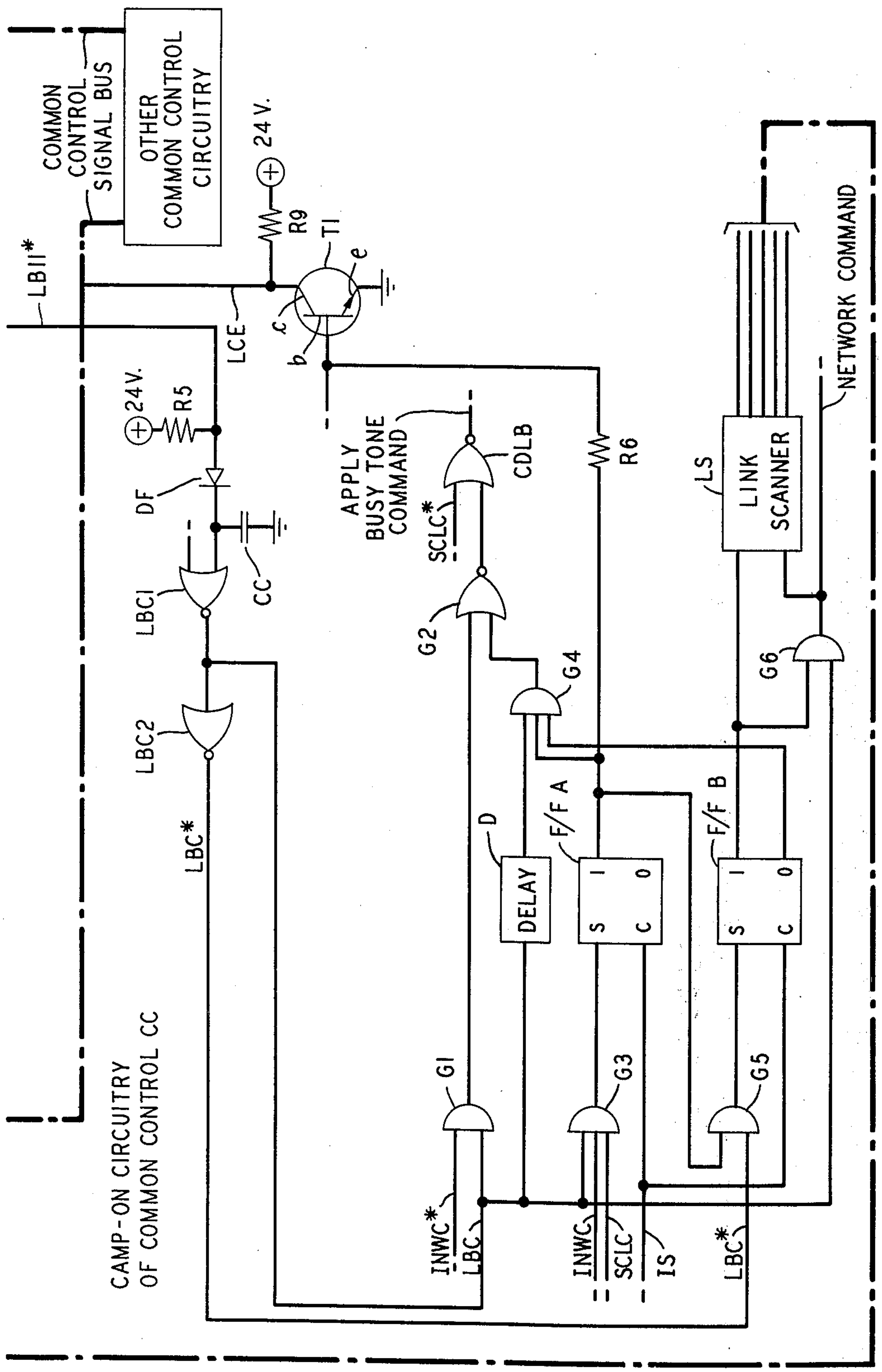
FIG. 3 schematically shows camp-on control and test circuitry in a common control circuit of the telephone switching system.

Turning now to FIGS. 2 and 3, the specific illustrative structure and operation of my camp-on circuitry is described with reference to line circuit LC11. Telephone station TS11 is connected over tip and ring leads T and R to switching network SN. Tip lead T is extended through network SN to common control circuit CC for service request enabling via an off-normal contact HM-1 of a conventional crossbar switch hold magnet and lead BI*. Ring lead R is connected through network SN to line circuit LC11 via lead BE and another off-normal contact HM-2. When station TS11 is on-hook, tip and ring leads T and R are opened and no call connections exist via the crossbar switch vertical and horizontal links of network SN to the tip, ring and sleeve leads T, R and S for station TS11.

An enable gate ENAB of circuit LC11 is connected to lead BE for detecting service requests from station TS11. Gate ENAB is also advantageously connected to sleeve lead S and a Zener diode arrangement for camp-on control and callback operations. For service request, callback and camp-on scanning and call operations, gate ENAB is connected to common control circuit CC via a line circuit enable lead LCE which is multipled to all other line circuits LC12–LC48. An output lead GO* of gate ENAB is connected as an input to an address gate ADDR of line circuit LC11.

Gate ADDR cooperates with the common control CC and other circuits of the system to perform address scanning for service request, callback and terminating call operations including camp-on. It receives individual station address signals from circuit CC via conductors T*a is multipled to all line circuits in a same "tens" group, which for line circuit LC11 is illustratively line circuits LC11–LC19**. Conductors U*a** and U*x are multipled to all other line circuits sharing the same units digit. Thus, for line circuit LC11**, all line circuits having the same 1 units digit are multiple connected to the conductors U*a** and U*x**. An output lead GAO is connected to an input to a status gate STAT and generates a control signal indicating the addressed line circuit whenever the gate ADDR is fully enabled.

The gate STAT is utilized to supply the common control CC with information as to the initial line busy-idle, callback and camp-on busy-idle status of an associated line during addressing operations. Specifically, during service request scanning, callback and terminating call addressing including those for camp-on, gate STAT receives a single input signal from gate ADDR for supplying an output status signal to lead LCS* which is passed to control circuit CC via network SN. The output signals pass through network SN via a hold magnet off-normal contact HM-3 and a diode DI to terminal T11 of a service connection field for indicating an idle status and through contact HM-4, terminal B11 and diode DB11 for indicating a busy status. Terminals T11 and TNRC are for appropriate cross-connections illustratively for class-of-service. By way of example, class-of-service crossconnections are made for line circuit LC11 between terminal T11 and a nonrestricted class-of-service terminal TNRC associated with a conductor NRC* to the common control.

Gate HOLD is functionally interrelated with the common control circuit operations for controlling the actuation of a crossbar switch hold magnet HM in network SN to establish call connections. Typically, the common control first determines the busy-idle status of a line circuit in call processing by monitoring gate STAT. Thereafter, if the line is found to be idle, the common control CC applies a control signal to lead HEA* which cooperates with a signal from gate STAT to enable gate HOLD. The latter gate, when enabled, drives amplifiers QDR and QHD to operate hold magnet HM and locks the state of gate STAT.

Gate STR is used illustratively in combination with a steering relay STRR and amplifier QSD to steer the tip, ring and sleeve leads to "A" and "B" three-wire paths (not shown) through network SN in a manner as disclosed in the Greason-Weiner U.S. Pat. No. 3,697,700.

Idle Condition

During the idle condition of circuit LC11, station TS11 is on-hook and the common control CC processes calls through other of the line, trunk and attendant circuits of the system. In doing so, it applies line scanning and other call processing signals to leads which are multipled in common to a plurality of the line circuits LC11–LC48. These leads include, for example, the common tens and units address leads T*a**, U*a** and U*x** and the common line enable lead LCE and leads HEA* and HEB*.

Before describing the switching state of various gates in circuit LC11 are controlled by circuit CC, it is beneficial to review that the output of an OFF gate is referred to as a HIGH and illustratively is several volts above ground potential. In a similar fashion, the output of an ON gate is referred to as LOW and is illustratively ground potential.

When the control circuit CC is also idle, it applies a LOW to the line circuit enable lead LCE for switching gate ENAB OFF and, in turn, holding gate ADDR ON. At the same time, the address leads T*a**, U*a** and U*x** are held HIGH in the absence of call processing operations. The idle control circuit CC also holds leads HEB*, BI*, and HEA* HIGH. All inputs to gate STAT are therefore LOW for indicating an idle condition of station TS11 and control circuit CC. Thus, gate STAT is OFF and it holds a HIGH on lead LCS*. In summary, during the idle condition of circuit LC11, the leads having a * symbol following the lead designation have a HIGH thereon and all other leads of circuit LC11 have a LOW thereon.

Terminating Call To Idle Called Station

Connections through network SN are established for a terminating call between a called one of the line circuits LC11–LC48 and one of the central office trunk circuits COT1 – COT*n* or an intercom trunk circuit ITC under control of common control circuit CC. Illustratively, after an incoming call from a central office is received on trunk circuit COT1 for a station TS11, circuit CC is effective to control the completion of call connections for enabling all line circuits LC11-LC48 by applying a HIGH to lead LCE of FIG. 2. As a result, the ENAB gates in all line circuits LC11–LC48 turn ON for enabling their associated address gates ADDR. The control circuit CC next applies the address of the called station TS11 to the address leads T*a**, U*a** and U*x of the line circuit LC11. This address is in the form of LOW signals on the three address leads of only the called line circuit LC11. Consequently, its gate ADDR of FIG. 2 is switched OFF for, in turn, switching gate STAT of FIG. 2** ON and thereby applying a LOW to lead LCS*.

When line circuit LC11 is idle, the LOW on lead LCS* is propagated through the switching network SN to the control circuit CC for informing it of the idle status. The LOW on lead LCS* is propagated via contact HM-3, diode DI, crossconnections in the service connection field and lead NRC*. After receiving the LOW on lead NRC*, the common control CC activates line circuit LC11 as hereinafter described to complete call connections through network SN to trunk circuit COT1.

Control circuit CC in ascertaining that station TS11 is idle, causes a sequence of operations which result in the operation of network SN to interconnect line circuit LC11 with trunk circuit COT1 via a pair of crossbar switch verticals and a horizontal connecting link therebetween. The operations are effected in part by circuit CC making lead HEA LOW to switch gate HOLD OFF for driving amplifiers QDR and QHD via resistors R1 and R2 to effect the operation of the crossbar switch hold magnet HM.

In operating, magnet HM activates network SN in a known manner to establish tip, ring and sleeve connections from circuit COT1 to circuit LC11 and station TS11. The latter station is connected over leads T and R to an individual crossbar switch vertical and via a horizontal link to another crossbar switch vertical connected to trunk circuit COT1. Circuit LC11 is further connected via sleeve S and the crossbar switch crosspoint to the SN network sleeve associated with the same crossbar switch horizontal link. The trunk circuit COT1 then transmits in a known manner a supervisory busy signal HIGH through the sleeve lead of network SN to lead S for holding amplifiers QDR and QHD ON and thereby maintaining magnet HM operated for the remainder of the call.

The operation of magnet HM also opens its contact HM-2 to disconnect line circuit LC11 from the ring lead R. Activated contact HM-1 also disconnects lead BI* from the tip lead T. As a result, the telephone line circuit for station TS11 is completely disconnected from the voice transmission path. The operation of contact HM-4 informs the common control CC that the connection between station TS11 and trunk circuit COT has been established. Specifically, contact HM-4 does so by switching the LOW on lead LCS* to lead LB11* via terminal B11 and diode DB11. Circuit CC thereafter switches lead LCE LOW to turn OFF all of the gates ENAB with the result that gate ADDR in line circuit LC11 switches ON.

Station TS11 is now connected through network SN to trunk circuit COT1 which maintains the network connection by holding the hold magnet HM operated by the HIGH on sleeve S as priorly explained. Thereafter, circuit CC returns leads BI*, HEA*, HEB*, U*a**, U*x** and T*a** to their idle HIGH state for switching gate STAT OFF, and thereby making lead LCS* HIGH. Line circuit LC11 thereafter is held engaged on the call connections by the HIGH on sleeve S from circuit COT1 for the duration of the call.

Terminating Call to Busy Called Station

Call processing from a central office trunk circuit, such as trunk circuit COT*n* to a busy station, illustratively station TS11, is essentially the same as described hereinbefore with regard to the call from trunk circuit COT1 to station TS11. A departure in the processing occurs when the line circuit status lead LCS* is switched LOW, as priorly explained, to interrogate the busy-idle status of circuit LC11 and the associated station TS11. When circuit LC11 is busy on call connections through network SN, as described previously, the hold magnet HM of FIG. 2 is operated and, accordingly, its off-normal contact HM-4 is closed to extend the LOW on lead LCS* through terminal B11, diode DB11 and the line busy lead LB11* to the common control circuit CC of FIG. 3 for operating its busy signal processing circuitry.

In accordance with the illustrative embodiment of my invention, the common control CC responds to the LOW on lead LB11* by testing the line circuit LC11 to determine whether the call connections through network SN may be camped-on by the incoming call on trunk circuit COTn. Before proceeding with a description of the test sequences, it is advantageous to explain that the exemplary camp-on circuitry of FIG. 3 is arranged to allow only one central office trunk circuit to be camp-on connected to link paths through network SN to a busy line circuit. Illustratively, when a first central office trunk circuit is camp-on connected to line circuit LC11, that trunk operates circuit LC11 for precluding a second trunk circuit from camping on the connections. The first trunk circuit does so by applying a sufficiently HIGH voltage via network SN to the sleeve lead S for switching diode DZ into its zener conducting region to maintain gate ENAB ON as long as the camp-on condition persists. Thereafter, when the common control CC addresses circuit LC11 on a subsequent call including the one on trunk circuit COTn and for the purpose of determining busy-idle status of circuit LC11, a line busy LOW signal is immediately returned to the common control CC via lead LB11*. The path for supplying the line busy signal to lead LB11* is via the enabled gate ENAB, the addressed gate ADDR, the ON gate STAT supplying a LOW to lead LCS*, contact HM-4, terminal B11, and diode DB11. Consequently, the LOW supplied to lead GO* by gate ENAB being ON causes all inputs including the address leads T*a**, U*a** and U*x** to gate ADDR to be LOW for supplying a HIGH to lead GAO during the busy-idle camp-on test.

Turning now to the camp-on circuitry according to my exemplary embodiment of FIG. 3, the camp-on test sequences are described for the call on trunk circuit COTn. When, as priorly explained, a LOW is extended over lead LB11* to the common control CC for indicating the busy condition of line circuit LC11, the camp-on circuitry of FIG. 3 responds by testing the camp-on busy-idle status of circuit LC11. The test is performed by the common control CC switching a LOW to the line circuit enable lead LCE while line circuit LC11 is addressed and then monitoring the line busy lead LB11*. If, as a result of these actions, the LOW is maintained on lead LB11* under control of diode DZ and a camping-on trunk, my exemplary camp-on circuitry is advantageously arranged to detect a camp-on busy condition and to operate the common control for causing a busy tone to be returned immediately to the calling party. An advantage of my invention is that the camp-on busy is detected by the circuitry of FIG. 3 without any scanning through the link circuits LC11–LC48 of FIG. 2.

My illustrative camp-on circuitry further detects the absence of a camp-on connection to line circuit LC11 when a HIGH appears on the monitored lead LB11* following the switching of lead LCD LOW. The camp-on circuitry is then automatically operated to initiate a scanning of each to the link circuits LK1-LKn for locating the horizontal link connected to line circuit LC11. A location is made by the scanned link circuit LK1 marking the sleeve lead SB of the associated horizontal link for, in turn, activating circuit LC11 via its zener diode DZ to cause a camp-on idle, or LOW, signal to be applied to lead LB11*. My camp-on circuitry then stops further link scanning and generates a network command which causes trunk circuit COTn to be camp-on connected to the SN network connections and line circuit LC11 in a routine manner.

The specific camp-on test sequence is initiated by the LOW on lead LB11* following the initial line busy check of circuit LC11. In FIG. 3, the LOW on lead LB11* cooperates with resistor R5, diode DF and capacitor CC to switch gate LBC1 OFF and thereby provide a HIGH on lead LBC. The latter signal is applied to an input of an AND gate G3, which has two other inputs, namely the inward call and the strobe called line circuit leads INWC and SCLC, respectively. A HIGH is applied to lead INWC by control circuit CC for inward processing of a call from a central office trunk circuit, such as circuit COTn. Lead SCLC receives a strobe HIGH pulse from other portions of the common control CC for idle camp-on tests. Upon all inputs to gate G3 being coincidently HIGH, an output HIGH is generated by gate G3 for setting flip-flop F/F A and thereby providing a HIGH at its 1 output and a LOW at its 0 output. The HIGH at the 1 output is extended through resistor R6 to the base *b* of transistor T1 for switching it ON and thereby producing an output LOW on lead LCE. The latter signal switches gate ENAB of FIG. 2 OFF if line circuit LC11 is not already camped-on. On the other hand, if line circuit LC11 is camped-on, the LOW applied to lead LCE does not switch gate ENAB OFF because it remains ON under control of the special supervisory signal supplied by a trunk circuit through diode DZ for holding gate ENAB ON during the camp-on.

When gate ENAB remains ON due to the camp-on, a line busy LOW is maintained on lead LB11* as priorly explained. As a result, my camp-on circuitry is advantageously equipped to generate an Apply Busy Tone Command for causing the common control CC to effect a return of a busy tone to the calling customer in a routine manner and as a signal that the call cannot then be completed. For this purpose, I provide a gate G4 which has three inputs, two of which are HIGH at the 1 and 0 outputs of flip-flops F/F A and F/F B, respectively. A third input is connected to a delay device D which is responsive to a HIGH on lead LBC for producing a HIGH at the third input to gate G4 after a time delay period. It is during this delay period, that the lead LBC is monitored to determine whether line circuit LC11 is or is not camped-on by a trunk circuit.

Following an expiration of the delay period, all inputs to gate G4 are coincidently HIGH for detecting a camp-on of line circuit LC11. Thus, gate G4 produces an output HIGH for controlling a NOR gate G2 which, in turn, switches gate CDLB ON for generating the APPLY BUSY TONE COMMAND. The common control CC responds to the command by causing a busy tone to be returned to the calling party in a known manner. Control circuit CC then resets its camp-on circuitry by applying a signal to the system idle lead IS for resetting flip-flop F/F A. Control circuit CC then releases from the call.

Where line circuit LC11 is not camped-on during the time delay monitoring period, a camp-on idle HIGH signal is applied to lead LB11* in response to my camp-on circuitry switching lead LCE LOW as already explained. Lead LB11* HIGH causes the output of gate LBC1 to switch LOW withdrawing the HIGH from the input of the delay device D and thereby precluding a generation of the Apply Busy Tone Command. The LOW on lead LBC also switches gate LBC2 to produce a HIGH on lead LBC* as a signal to initiate scanning of link circuits LK1–LK*n*.

A scan initiate signal is generated by gate G5 at its output when its two inputs from lead LBC* and the 1 output of flip-flop F/F A are coincidently HIGH. The resultant HIGH output of gate G5 sets flip-flop F/F B which, in turn, supplies a HIGH at its 1 output for activating the link scanner LS. Outputs of the activated link scanner LS sequentially generate LOW signals to address each of the link circuits LK1–LK*n* for successively marking each of the associated crossbar switch horizontal links to identify the one connected to line circuit LC11. As each link circuit, for example, circuit LK1 of FIG. 2, is addressed, its gate CB is switched OFF for enabling the current provided by resistor R7 to be added to that furnished by resistor R8 and together with diode DL to raise the voltage on the sleeve lead SB and extending through a crossbar switch crosspoint of network SN to lead S of line circuit LC11. The voltage increase switches diode DZ into its zener conducting region for successively turning gate ENAB ON, ADDR OFF and STAT ON and thereby generating a LOW on lead LCS*. Gate ADDR is switched OFF in part by the coincident addressing of leads T*a**, U*a** and U*x** by the common control CC. The LOW at lead LCS* results in the stopping of further scanning by scanner LS of FIG. 3 under control of gate G6 of FIG. 3. To do so, the LOW on lead LCS* is extended through network SN to lead LB11*, as previously described, and causes gate LBC1 to produce a HIGH on lead LBC. The latter signal is coincident at the input of gate G6 with the HIGH at the 1 output of flip-flop F/F B and switches gate G6 ON for deactivating scanner LS to thereby stop link scanning at link circuit LK1 and concurrently identify it by the address provided at the link address leads. Importantly, the switching of gate G6 ON generates a Network Command to indicate that the in-use link has been found and to cause the common control CC to connect the calling trunk circuit COTn to the identified link. After the latter actions are completed, the control circuit CC applies to HIGH to the idle set lead IS for resetting flip-flops F/F A and F/F B and, in turn, my camp-on circuitry. The camping-on trunk circuit COT*n* remains isolated speechwise from the identified link during camp-on and is only cut-through speechwise after the prior call is terminated. In addition, circuit COT*n* extends a camp-on supervisory voltage in a conventional manner and over the sleeve lead path through network SN to lead S of circuit LC11 for operating diode DZ in its zener region and thereby switching gate ENAB ON to generate a steady state camp-on busy signal LOW on lead GO*. The latter signal is extended to gate ADDR for subsequent camp-on busy testing by my illustrative circuitry of FIG. 3 on any call thereafter received.

My exemplary embodiment is further designed illustratively to deny camp-on call service to intercom calls between the stations TS11 – TS48. It advantageously does so under control of the common control circuit CC when that circuit recognizes an intercom call from a routine translation of dialed digits from a PBX calling station. Following such a translation, the common control supplies a HIGH to lead INWC* of the camp-on control circuitry of FIG. 3 for causing the generation of an APPLY BUSY TONE COMMAND. This command is generated as a result of coincident HIGH inputs to gate G1 on leads INWC* and LBC as priorly explained for serially activating gates G2 and CDLB immediately upon an initial busy-idle test of the called station. The common control responds to the busy tone command and immediately returns a busy tone to the calling customer.

It is to be understood that the hereinbefore described arrangements are illustrative of the application of principles of my invention. In light of this teaching, it is apparent that numerous other arrangements may be devised by those skilled in the art without departing from the spirit and scope of the invention.

What is claimed is:

1. Camp-on circuitry for use in a communication system having
   a plurality of line circuits and
   means for selectively applying an enabling signal to said circuits to determine the busy-idle call status of said circuits, and said circuitry comprising;
   means responsive to a receipt of a busy call status signal from a called one of said circuits for withdrawing said enabling signal from said circuits to ascertain the camp-on busy-idle status of said called one of said circuits, and
   busy control means subsequently responsive to a receipt of a camp-on busy status signal from said called one of said circuits for controlling a return of a supervisory busy signal to a calling station.

2. Camp-on circuitry in accordance with claim 1 wherein said busy control means includes means activated during an application of said enabling signal to said called one of said line circuits on an intercom call thereto and in response to a busy call status signal from said called one of said line circuits for operating said busy control means on said intercom call prior to any withdrawing of said enabling signal from said circuits and to return a supervisory busy signal to a calling one of said line circuits.

3. Camp-on circuitry in accordance with claim 1 further comprising means operated upon a receipt of a camp-on idle status signal for examining each of said line circuits to identify said called one of said circuits, and means activated by said examining means for controlling a completion of camp-on call connections to an identified called one of said circuits.

4. Camp-on circuitry in accordance with claim 3 wherein said examining means includes a plurality of link circuits each of which is operably connectable to an individual one of said line circuits.

a link scanner activated upon a receipt of a camp-on idle status signal on an inward terminating call for sequentially addressing each of said link circuits individually to operate said called one of said line circuits, and means responsive to a link circuit operation of said called one of said line circuits for deactivating said scanner and stopping scanner addressing at said called one of said line circuits.

5. Camp-on circuitry for a switching system having a plurality of line circuits, a switching network operable for establishing link connections on calls for said circuits, network control means responsive to a receipt of a call for any one of said circuits for operating said network to establish a link connection to the called line circuit, and means in said called line circuit subsequently responsive on another call for supplying a busy link connection signal, and said camp-on circuitry comprising a plurality of link circuits each of which is individually connected to one of said network link connections;

a link scanner operable following a receipt of a busy link connection signal for sequentially activating said link circuits to supply a camp-on control signal to said called line circuit, and camp-on control means responsive to said control signal from said called line circuit for selectively cooperating with said network control means to control an operation said network for camp-on connecting said other call to said individual one of said link connections to said called line circuits.

6. Camp-on circuitry in accordance with claim 5 wherein a special supervisory signal is applied to link connections for a call camp-on connected thereto, and said called line circuit includes means responsive to said supervisory signal for generating a camp-on busy signal, and said camp-on circuitry further comprises logic circuit means responsive to a busy link connection signal and a camp-on busy signal for operating said network control means to return a supervisory busy signal on a subsequently received call.

7. Camp-on circuitry in accordance with claim 5 further comprising control circuit means for starting an operation of said link scanner and including a bistable switching device and gate means responsive on an inward terminating call to a receipt of a camp-on idle signal for activating said switching device and gate means to start said operation of said link scanner, and said camp-on control means includes a logic gate controlled by said activating of said switching device and a camp-on control signal from said called line circuit for stopping said operation of said link scanner.

8. Camp-on circuitry in accordance with claim 5 wherein said switching network comprises a crossbar switching network having a plurality of switch verticals for terminating functional switching circuits including said line circuits and a plurality of switch horizontals each of which provides link connections among said switch verticals.

each of said link circuits is connected to an individual one of said switch horizontals, said link scanner successively activates said link circuits to supply said camp-on control signal through one of said crossbar switch horizontal and vertical link connections to said called line circuit, and means in said called line circuit for extending said camp-on control signal through said cross-bar switching network to said camp-on control means.

9. In a telephone system having a plurality of line circuits, a switching network operable for establishing link connections on calls for said circuits, common control means responsive to a receipt of a call for any one of said circuits for operating said network to establish a link connection to the called line circuit, and means in said called line circuit subsequently responsive to a receipt of another call for said called line circuit for producing busy connection signals for said one of said circuits, the improvement comprising means responsive to a busy signal from said called line circuit for controlling said producing means to generate a camp-on idle signal, a plurality of link circuits each of which is connected to an individual one of said link connections of said network, circuit means responsive to said camp-on idle signal for said called line circuit for sequentially operating each of said link circuits selectively to mark each of said link connections, means responsive to a marking of said link connection connected to said called line circuit for providing and identification signal through said called line circuit to identify said last-mentioned link connection, and means in said common control means responsive to said identifying signal for controlling an operation of said network to camp-on connect said other call on said link connection connected to said called line circuit.

10. The improvement of claim 9 further comprising means activating said called line circuit for applying a camp-on busy signal through said network to said common control means on an inward terminating call, and busy control means responsive to said camp-on busy signal for operating said common control means to preclude camp-on connections through said network to said called line circuit for said terminating call.

11. The improvement of claim 10 wherein said busy control means includes logic means responsive to a receipt of a busy connection signal followed by a camp-on busy signal from said called line circuit for supplying a camp-on busy command to said common control means.

12. The improvement of claim 11 wherein said logic means comprises a logic arrangement responsive to a receipt of a busy connection signal via said network from said called line circuit for controlling an examination of the camp-on busy-idle status of said link connection to said called line circuit, and logic circuit means including a delay device responsive to a camp-on busy status signal through said network from said called line circuit for supplying said camp-on busy command to said common control means.

13. The improvement of claim 12 wherein said logic arrangement includes a bistable flip-flop, and gate means responsive to coincident receipt of signals including inward terminating call and busy connection signals for operating said flip-flop for controlling via said called line circuit an examination of said camp-on busy-idle status of said link connection to said called line circuit.

14. The improvement of claim 13 wherein said logic circuit means includes gate circuitry controlled by said delay device and flip-flop for supplying a camp-on busy tone command to said common control means.

15. The improvement of claim 9 wherein said circuit means includes a link scanner activatable for sequentially operating said link circuits selectively to mark each of link connections, a logic circuit responsive to said camp-on idle signal from said called line circuit for activating said link scanner, said called line circuit being responsive to a marking of said link connection connected thereto for applying said link identification signal through said network, and a control gate arrangement controlled by a receipt of said identification signal from said network for deactivating said link scanner.

16. The improvement of claim 15 wherein said logic circuit includes a bistable switching device, and a gate circuit responsive to a receipt of a camp-on idle signal for operating said switching device to commence an activation of said link scanner and thereby operating said link circuits sequentially to mark each of said link connections.

17. The improvement of claim 9 further comprising intercom control means responsive to a receipt of a busy connection signal from said called line circuit on an intercom call for operating said common control means to preclude camp-on connections of said intercom call through said network link connection to said called line circuit.

18. The improvement of claim 17 wherein said intercom control means includes gate means responsive to a coincident receipt of said busy connection signal from said called line circuit on said intercom call and an intercom call identifying signal for supplying a busy tone command to said common control means.

19. A private branch exchange telephone system comprising a plurality of line circuits, a crossbar switching network having a plurality of switch verticals for terminating functional switching circuits including said line circuits and a plurality of switch horizontals each of which provides link connections among said switch verticals, common control means responsive to a receipt of a terminating call for any one of said circuits for operating said network to establish a link connection to the called line circuit, a plurality of link circuits each one of which is connected to an individual one of said network link connections and being addressable for marking an individual one of said link connections for identification, said common control means including means responsive to another terminating call for addressing said called line circuit to determine a busy status of the network link connection connected thereto, means responsive to a busy status of said last-mentioned link connection for controlling each of said line circuits to ascertain the camp-on busy-idle status of said called line circuit, means responsive to a camp-on busy status signal from said called line circuit via said network for generating a busy tone command for said other terminating call, means responsive to a camp-on idle status signal from said called line circuit via said network for sequentially addressing each of said link circuits for marking said link connection connected to said called line circuit, said called line circuit including means responsive to said last-mentioned link connection marking for sending a link connection identifying signal to said common control means via said network, and means in said common control means responsive to said identifying signal for arresting further addressing of said link circuits and generating a network command for camp-on connection of said other terminating call to said network link connection to said called line circuit.

* * * * *